United States Patent [19]

Däges et al.

[11] Patent Number: 5,226,320

[45] Date of Patent: Jul. 13, 1993

[54] MEASURING DEVICE AND PROCESS FOR DETERMINING THE FILL LEVEL IN FLUID CONTAINERS, PREFERABLY FOR TANK INSTALLATIONS, WITH A SOUND WAVEGUIDE

[75] Inventors: Johannes Däges, Lichtenfels; Martin Rüttel, Grub A. Forst, both of Fed. Rep. of Germany

[73] Assignee: Siemens Aktiengesellschaft, Munich, Fed. Rep. of Germany

[21] Appl. No.: 840,746

[22] Filed: Feb. 24, 1992

[30] Foreign Application Priority Data

Aug. 22, 1989 [EP] European Pat. Off. ........ 89115488.2

[51] Int. Cl.$^5$ .............................................. G01F 23/28
[52] U.S. Cl. ....................................... 73/290 V; 73/292; 367/908; 367/99; 181/124; 181/402; 374/142
[58] Field of Search ............ 73/290 V, 292; 367/908, 367/99; 181/123, 124, 400, 402; 374/142

[56] References Cited

U.S. PATENT DOCUMENTS

| | | | |
|---|---|---|---|
| 3,184,969 | 5/1965 | Bolton | 73/290 V |
| 3,214,974 | 11/1965 | Altman et al. | 73/290 V |
| 3,834,233 | 9/1974 | Willis et al. | 73/290 V |
| 4,170,765 | 10/1979 | Austin et al. | 73/290 V |
| 4,305,283 | 12/1981 | Redding | 73/290 V |
| 4,748,846 | 6/1988 | Haynes | 73/290 V |
| 4,815,323 | 3/1989 | Ellinger et al. | 73/290 V |
| 5,036,703 | 8/1991 | Eriksson | 73/290 V |
| 5,095,748 | 3/1992 | Gregory et al. | 73/290 V |
| 5,127,266 | 7/1992 | Maresca et al. | 73/290 V |

FOREIGN PATENT DOCUMENTS

| | | |
|---|---|---|
| 0106677 | 4/1984 | European Pat. Off. . |
| 0138541 | 4/1985 | European Pat. Off. . |
| 2017915 | 10/1979 | United Kingdom ............. 73/290 V |

OTHER PUBLICATIONS

Oil & Gas Journal, vol. 87, No. 1, Jan. 2, 1989, Tulsa, Okla., US: pp. 39-44 (Edvardsson).
IEEE Transactions on Ultrasonics, vol. UFF34, No. 2, Mar. 1987, New York US, (Jacobson et al.) pp. 212-224.
Ultrasonics, vol. 4, No. 171/177, Oct. 1966, p. 171, (Franchi).
Journal of Physics E. Scientific Instruments, vol. 16, No. 10, Oct. 1983, Dorking, GB, pp. 959-963 (Asher).

*Primary Examiner*—William A. Cuchlinski, Jr.
*Assistant Examiner*—Diego F. F. Gutierrez
*Attorney, Agent, or Firm*—Herbert L. Lerner; Laurence A. Greenberg

[57] ABSTRACT

In a level measuring device for containers filled with fluid, preferably tanks in tank installations, the fill level height h is determined from the transit time of ultrasound pulses which are emitted by first sound pulse transmitters along a main measuring path extending from the bottom region of the tank to the fluid surface and are reflected from the fluid surface to first sound pulse receivers. Temperature sensors are provided for finding the temperature distribution throughout the fill level height h. Processing the measurements provides a mean temperature TM in the fluid volume. In addition to the main measuring path there is a reference path in the fluid volume, with second sound pulse transmitters and receivers and a reference temperature sensor for measuring a reference temperature $T_{Ref}$. The reference path makes it possible to find the sound velocity $v^*(T_{Ref})$ in the fluid volume at the reference temperature $T_{Ref}$ from the measured difference in transit time, so that a temperature-corrected sound velocity v(T) in the fluid volume: $v(T) = v^*(T_{Ref})[1 + K_k \cdot \Delta T]$, and thus a temperature-corrected fill level height $h(T) = v(T) \cdot t_H$, are found, in which $\Delta T = TM - T_{Ref}$, and $K_k$ is a medium-dependent correction factor. The measuring device and a process for determining the fill level use a measuring tube with first and second sound waveguides.

23 Claims, 5 Drawing Sheets

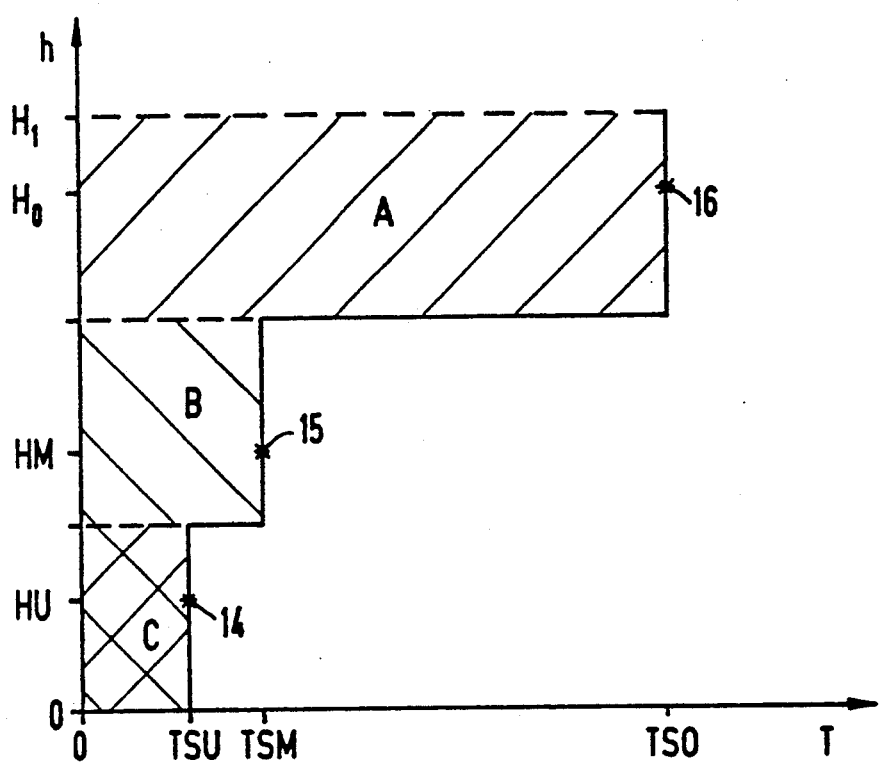
FIG 3
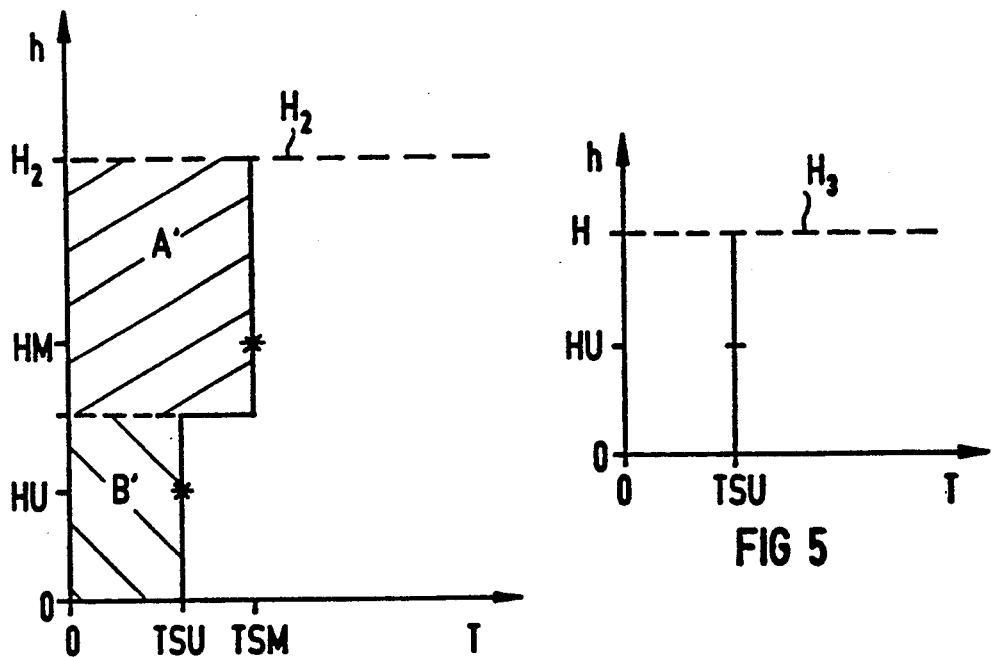
FIG 4
FIG 5

5,226,320

MEASURING DEVICE AND PROCESS FOR DETERMINING THE FILL LEVEL IN FLUID CONTAINERS, PREFERABLY FOR TANK INSTALLATIONS, WITH A SOUND WAVEGUIDE

CROSS-REFERENCE TO RELATED APPLICATION

This application is a continuation of international application PCT/DE90/00640, filed Aug. 22, 1990.

BACKGROUND OF THE INVENTION

1. Field of the Invention

The invention relates to a fill level measuring device and method for containers filled with fluid, preferably for tanks of tank installations, wherein a fill level height is determined from a sound transit time of ultrasound pulses, which are emitted by first sound pulse transmitters along a main measuring path extending from the bottom region of the container up to the surface of the fluid and are reflected from the surface of the fluid to first sound pulse receivers.

2. Description of the Related Art

Such a fill level measuring device which is known from Published European Application No. 0 106 677 A3, corresponding to U.S. Pat. No. 4,748,846, operates according to the principle of echo depth sounding systems. In that device, path lengths are derived from the transit time of sound pulses. This transit time or transit time difference is obtained in each case from the measured time difference elapsing between the transmission of an ultrasound pulse until the reception of the ultrasound pulse reflected by the surface of the fluid. The sound pulse transmitters and sound pulse receivers are preferably constructed as transmit-receive test heads, which are suitable for both transmitting and receiving ultrasound pulses. The sound velocity in a fluid volume is dependent on the density. In order to obtain an average, density-corrected sound velocity in the fluid volume, reference reflectors that are distributed over the fill level height at a defined spacing from one another and from the sound pulse transmitters and receivers are provided in the known fill level measuring device. The ultrasound pulses reflected at the reference reflectors produce transit time differences, which are used together with the associated known sound travel distances to ascertain an average sound velocity that takes the density in the fluid volume into account. Additionally, a temperature sensor is disposed in the lower region of the container and with it, the temperature of the fluid at some point can be ascertained. A calculation of an average temperature of the fluid volume is also provided. The average temperature is needed in order to be capable of calculating the density and thus the container contents once the fill level height is ascertained. In order to calculate the average temperature, known linear characteristic curves $\Delta v/\Delta T$ are the point of departure. They indicate the variation in the sound velocity as a function of the variation in temperature. The known quotient can be made equivalent to a quotient ascertained by measurement, in which a difference $v_L - v_{Ref}$ is located in the numerator and a difference $T_{AV} - T_{Ref}$ is located in the denominator.

Reference symbol $v_L$ stands for an average sound velocity, $v_{Ref}$ stands for a reference sound velocity, $T_{AV}$ stands for the average temperature, and $T_{Ref}$ stands for a reference temperature. The expense and complication in terms of apparatus and electronics relative to the accuracy is relatively high in that known fill level measuring device. Moreover, a number of control measurements must be carried out, because scattered beams occur which have to be eliminated in the measurements as a result of the relatively high number of reference reflectors that are distributed over the fill level height.

SUMMARY OF THE INVENTION

It is accordingly an object of the invention to provide a measuring device and a process for determining the fill level in fluid containers, preferably for tank installations, with a sound waveguide, which overcome the hereinafore-mentioned disadvantages of the heretofore-known methods and devices of this general type, which make do without reference reflectors and thus avoid scattered beams and with which high accuracy and reliable operation can nevertheless be attained. An accuracy in the fill level indication of at most ±1 mm measuring tolerance, but preferably even less, should be attained. The expenditure for measurement pickups and the associated expenditure for electronic processing of measured values should be kept within limits.

With the foregoing and other objects in view there is provided, in accordance with the invention, a fill level measuring device for containers filled with fluid, preferably for tanks of a tank installation, comprising first sound pulse transmitters emitting ultrasound pulses along a main measuring path from a bottom region of a container to a surface of a fluid volume in the container, and first sound pulse receivers receiving the ultrasound pulses being reflected by the surface of the fluid volume, for determining a fill level height h from a sound transit time of the ultrasound pulses; means for detecting a temperature distribution over the fill level height having an output variable being a mean temperature TM in the fluid volume; at least one second sound pulse transmitter and at least one second sound pulse receiver respectively defining a beginning and an end of a reference measuring path of a partial fluid volume, the means for detecting the temperature distribution including at least one reference temperature sensor for measuring a reference temperature $T_{Ref}$ of the partial fluid volume of the reference path, and for ascertaining a sound velocity $v^*(T_{Ref})$ in the fluid volume at the reference temperature $T_{Ref}$ on the basis of a given measured transit time difference $\Delta t^*$ by means of the reference path, for determining a temperature-corrected sound velocity $v(T)$ in the fluid volume:

$$v(T) = V^*(T_{Ref})[1 + K_k \cdot \Delta T]$$

and a temperature-corrected fill level height $$h(T) = v(T) \cdot t_H$$

in which
$\Delta T = TM - T_{Ref}$ $$K_k = \frac{1}{\Delta T^*} \cdot \frac{v(T_1) - v(T_0)}{v(T_0)}$$

$$\Delta T^* = T_1 - T_0$$

and wherein:
$T_1$ and $T_0$ are two different temperatures of the fluid volume measured on the reference measuring path with the at least one reference temperature sensor, $v(T_1)$ and $v(T_0)$ are associated sound velocities measured with the reference path, $K_k$ is a correction factor indicating a standardized variation in the sound velocity per degree of temperature variation of the fluid volume on the basis of the measurements of $T_1$, $T_0$, $v(T_1)$, $v(T_0)$, and $t_H$ is a portion of a transit time difference $\Delta t_1$ corresponding to the fill level height h being measured with each of the first sound pulse transmitters and receivers.

The advantages attainable with the invention are above all that no reference reflectors are disposed in the way of the main measuring path. Consequently, the ultrasound signal transmitted to the surface of the fluid and sent back by it reaches the sound pulse receiver practically unhindered. The means for temperature distribution over the fill level height need not be located in the cone formed by the beams of the main measuring path, but can instead be located laterally thereof.

In accordance with another feature of the invention, the means for detecting the temperature distribution also include at least one other other temperature sensor, the temperature sensors being disposed at a plurality of measurement points distributed over the fill level height, for measuring temperature values from which the mean temperature of the fluid volume can be derived by averaging.

In accordance with a further feature of the invention, the temperature sensors include at least one temperature sensor disposed in the vicinity of a bottom of the container, at least one temperature sensor disposed at approximately one-third and at least one temperature sensor disposed at approximately two-thirds of a maximum fill level height of the container. In this way it was already possible to attain very good measuring results with a fill level measuring device.

In accordance with an added feature of the invention, there is provided a vertically aligned first sound waveguide for the main measuring path, the first sound waveguide extending from a bottom region of the container up to a height above a highest fill level; the first sound waveguide having an interior communicating with a remaining fluid volume in the container through openings formed in the first sound waveguide; and the first sound waveguide having a lower end at which one of the first sound pulse transmitters and one of the first sound pulse receivers are disposed.

In accordance with an additional feature of the invention, the first sound waveguide has an outer surface, and the at least one other temperature sensor is at least two other temperature sensors secured to the outer surface of the first sound waveguide.

In accordance with yet another feature of the invention, there is provided a second sound waveguide for the reference measuring path, the at least one second sound pulse transmitter, the at least one second sound pulse receiver and the at least one reference temperature sensor being secured on the second sound waveguide, and the second sound waveguide having an interior communicating with a remaining fluid volume through at least one opening formed in the second sound waveguide.

In accordance with yet a further feature of the invention, the second sound waveguide is a transverse tube disposed near the bottom of the container.

In accordance with yet an added feature of the invention, the lower end of the first sound waveguide is structurally united with the transverse tube forming a T-shaped, continuously hollow measuring tube. A compact measurement array that is easy to mount is attained in this way.

In accordance with yet an additional feature of the invention, the main measuring path has a longitudinal axis, the transverse tube has a wall with an inner periphery, the first sound pulse transmitters and the first sound pulse receivers have a transmit-receive test head secured to the inner periphery of the transverse tube wall in alignment with the longitudinal axis of the the main measuring path, and the test head transmits ultrasound pulses from bottom to top and receives the ultrasound pulses traveling from top to bottom after being reflected by the surface of the fluid volume.

In accordance with again another feature of the invention, there is provided a third sound pulse transmitter and a third sound pulse receiver respectively transmitting from top to bottom and measuring from bottom to top, for determining a level of a sump formed by foreign fluids and contamination, below the fluid volume in the container.

In accordance with again a further feature of the invention, the transverse tube has ends, the at least one opening formed in the transverse tube is a downwardly pointing sound hole being formed in one of the ends and having an axis, and including a transmit-receive test head for the third sound pulse transmitter and the third sound pulse receiver being secured to the inner periphery of the transverse tube in alignment with the axis of the sound hole and above the sound hole.

In accordance with again an added feature of the invention, there is provided a fill tube for the fluid volume protruding into the interior of the container and having an axis, an access pipe or dome having a lid flange and a dome lid for sealingly guiding and retained the fill tube, the first sound waveguide being retained on and axially parallel to the longitudinal axis of the fill tube and having an outer surface, and measurement and current supply lines for the temperature sensors and the sound pulse transmitters and receivers being disposed on the outer surface of the first sound waveguide, and a gas-tight line duct in the dome lid through which the measurement and current supply lines are ducted to the outside.

In accordance with again an additional feature of the invention, the sound pulse transmitters and the sound pulse receivers are piezoceramic sensors, and the sound transit times are each measured from the moment of a sensor short circuit until the arrival of a first amplitude of an echo.

In accordance with still another feature of the invention, there is provided a transit time counter oscillator specifying counting pulses at a fixed rhythm for detecting the sound transit times, the frequency of the transmitted ultrasound pulses being in a ratio of 1:3 to 1:6 to the frequency of the transit time counter oscillator. Good measurement accuracy with measured value tolerances of less than 1 mm are obtained in this way.

In accordance with still a further feature of the invention, the frequency of the transmitted ultrasound pulses is 2 MHz and that of the transit time counter oscillator is 8 MHz.

The subject of the invention is also a method for determining the fill level in containers filled with fluid, preferably in tanks of tank installations, with a determination of the fill level from the sound transit time of ultrasound pulses, which are emitted by first sound pulse transmitters along a main measuring path, extending from the bottom region of the container to the surface of the fluid, and are reflected from the surface of the fluid to first sound pulse receivers.

This generic method, which is likewise known from Published European Application No. 0 106 677 A3, corresponding to U.S. Pat. No. 4,748,846, mentioned above, is intended to be performed, analogously to the fill level measuring device according to the invention, in such a way that it is unnecessary to work with a multiplicity of reference measuring pulses that are transmitted by a sound pulse transmitter and after being reflected from the reference reflectors are received by a sound pulse receivers and carried further for further processing. Instead, the method according to the invention should enable the fill level to be ascertained at least equally accurately, if not even more accurately, in proportion to the electrical, mechanical and electronic expenditure, without using reference reflectors.

With the objects of the invention in view, there is also provided a method for determining a fill level in containers filled with fluid, preferably in tanks of a tank installation, which comprises emitting ultrasound pulses from first sound pulse transmitters along a main measuring path extending from a bottom region of a container to a surface of a fluid volume in the container and reflecting the ultrasound pulses from the surface of the fluid volume to first sound pulse receivers, for determining a fill level height h from a sound transit time of the ultrasound pulses; ascertaining a temperature-corrected sound velocity v(T) in the fluid volume in accordance with the equation:

$$v(T) = v^*(T_{Ref}) \cdot [1 + K_k \cdot \Delta T],$$

ascertaining a temperature-corrected fill level height $$h(T) = v(T) \cdot t_H$$

therefrom, and defining a correction factor Kk with the equation:

$$K_k = \frac{1}{\Delta T^*} \cdot \frac{v(T_1) - v(T_0)}{v(T_0)}$$

wherein $$\Delta T^* = T_1 - T_0$$

$$\Delta T = T_M - T_{Ref}$$

and wherein TM is a mean temperature of the fluid volume derived by measuring the temperature at a plurality of measurement points distributed over the fill level height h; $v^*(T_{Ref})$ is a sound velocity ascertained at a reference temperature $T_{ref}$ along a reference path of known length in the fluid volume, the velocity being derived from transit time differences of the ultrasound pulses ensuing between a second sound pulse transmitter at a beginning and a second sound pulse receiver at an end of a reference path; $T_{Ref}$ is the reference temperature at the reference path at the time of the particular transit time measurement; $T_1$ and $T_0$ are two different temperatures of the fluid volume measured at the reference path; $v(T_1)$ and $v(T_0)$ are associated sound velocities ascertained with the reference path $K_k$ is a medium-specific correction factor indicating a standardized variation in the sound velocity per degree of temperature variation of the fluid volume; and $t_H$ is a portion of the transit time difference $\Delta t_1$ corresponding to the fill level height measured with the respective first sound pulse transmitters and receivers.

The advantages attainable with this method are considered above all to be that for every fill level measurement, a current correction factor is determined, even whenever there is no linear relationship between the variation in sound velocity as a function of the temperature variation of the fluid volume. This advantage also applies to the fill level measuring device of the invention. The mean temperature TM can be determined very accurately, as will be explained in further detail below, by measuring the temperature at a plurality of measuring points distributed over the fill level height.

In accordance with another mode of the invention, there is provided a method which comprises taking a sump height b in the container into account in the ascertainment of the fill level height h(T), and ascertaining the fill level h*(T) taking the sump height b into account in accordance with the equation:

$$h^*(T) = t_H \cdot v(T) + t_S \cdot v(T) - a + b,$$

wherein $t_S$ is a portion of a transit time difference $\Delta t_S$ corresponding to the sump height, being measured with a third sound pulse transmitter and receiver disposed in a region near the bottom of the fluid volume; a is a distance measured vertically between the first and the third sound pulse transmitters and receivers; and b is the sump height measured by the third sound pulse transmitters and receivers.

In accordance with a further mode of the invention, there is provided a method which comprises amplifying the sound pulses, received by the sound pulse receivers, as a function of the sound transit time. This is done in order to remain relatively constant for both shorter and longer transit times of the first amplitude.

In accordance with an added mode of the invention, there is provided a method which comprises minimizing feedback from surface motions in the fluid volume upon the fill level in a sound waveguide in which the main measuring path extends, by the waveguide itself and by multiple measurements.

Since the first second sound waveguides, or the measuring tube formed by the combination of the two, communicates with the fluid volume through openings, provision is made on one hand for a temperature balance within the main measuring path and the reference measuring path and the remaining fluid volume. On the other hand, this avoids so-called sound drifts, because the main and reference paths are largely decoupled from fluid motions of the remaining fluid volume.

In accordance with an additional mode of the invention, there is provided a method which comprises the pulse duration of the sound pulses is selected to be less when the fill levels are less, than when the fill levels are near a maximum allowable fill level.

This is done by reducing the transmission voltage for the piezoceramic of the ultrasound test heads or sound pulse transmitters and receivers. At low charge voltages of the piezoceramic, the settling time and thus the time not available for echo detection is substantially shorter.

In accordance with a concomitant mode of the invention, there is provided a method which comprises determining the fluid volume either from the fill level h(T) or h*(T), by multiplication by a factor taken for this purpose from a tank characteristic curve, and determining the fluid quantity therefrom, by multiplication by the density derived from the temperature distribution.

With the objects of the invention in view, it is also the subject of the invention to use a sound waveguide, as described above, as a T-shaped measuring tube combined from a longitudinal and a transverse tube, for accommodating and retaining not only one or more sound pulse transmitters and receivers but also the reference reflectors or screens of a fill level measuring device, in which the reference reflectors or screens are disposed over the fill level height at a defined spacing from one another and from the sound pulse transmitters and receivers, and the ultrasound pulses reflected from the reference reflectors or screens produce transit time differences, which are used together with the associated known sound travel lengths to ascertain an average sound velocity in the fluid volume that takes the density in the fluid volume into account, wherein the fill level is ascertained from the average sound velocity and from the transit time differences, referred to the surface of the fluid, of the ultrasound measuring pulses.

Other features which are considered as characteristic for the invention are set forth in the appended claims.

Although the invention is illustrated and described herein as embodied in a measuring device and a process for determining the fill level in fluid containers, preferably for tank installations, with a sound waveguide, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is a diagram for ascertaining a mean temperature TM with three temperature sensors distributed over a fill level height;

FIG. 4 is a diagram corresponding to FIG. 3, in which only two temperature sensors are used to ascertain the mean temperature TM, because the fill level has dropped;

FIG. 5 is a corresponding diagram, in which only the lowermost temperature sensor is used to determine the mean temperature TM, because of a low fill level;

DESCRIPTION OF THE PREFERRED EMBODIMENT

Figure 1:
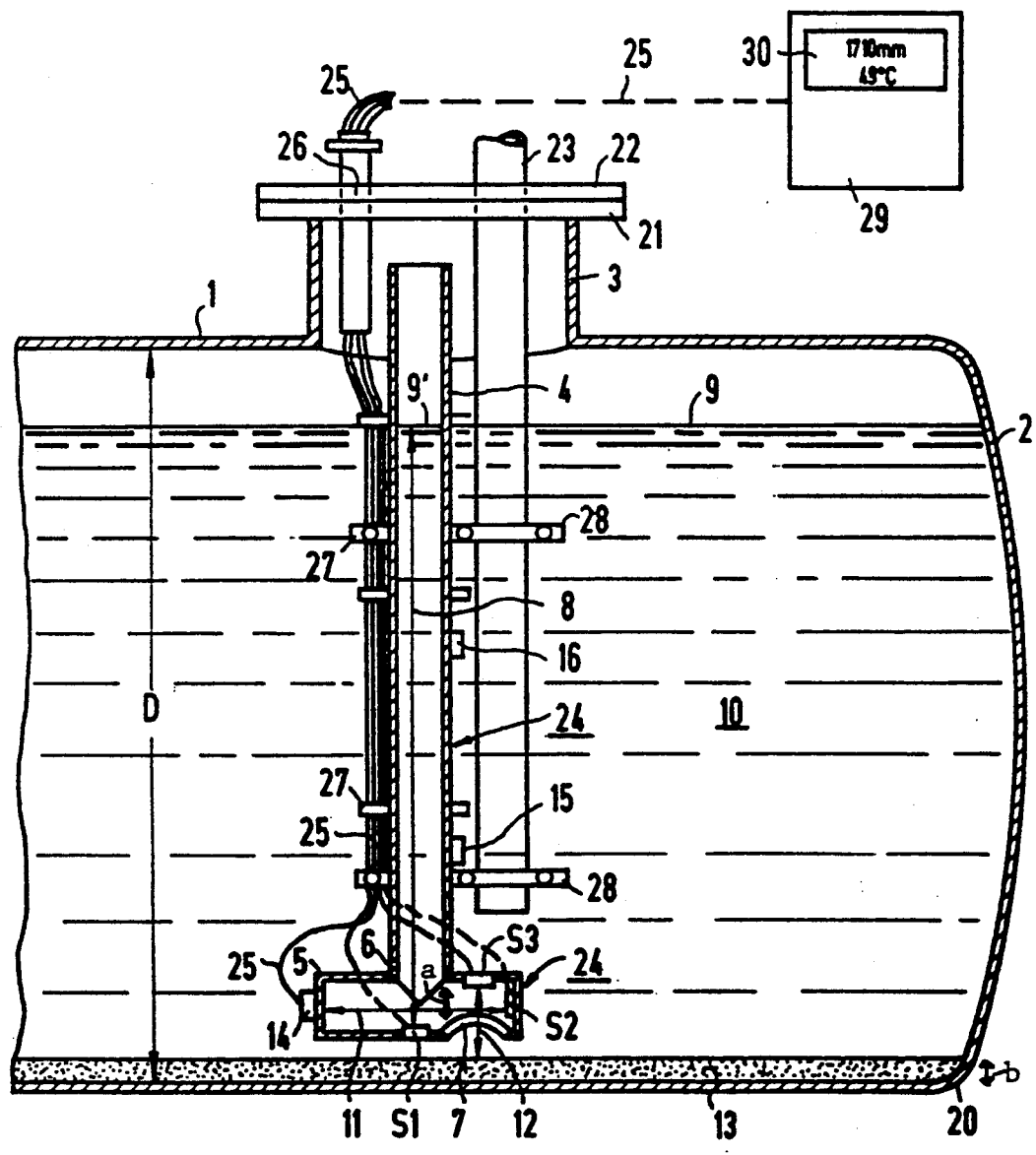
FIG. 1 is a fragmentary, diagrammatic, partially sectional view of a tank of a tank installation, which is provided with a fill level measuring device according to the invention.

Referring now in detail to the figures of the drawing, which show several exemplary embodiments that will be described below, in order to provide a further explanation of the fill level measuring device and of the associated method for determining the fill level according to the invention and first, particularly, to FIG. 1 thereof, there is seen a tank 20 having a cylindrical middle part 1 and slightly bulging, rounded end walls 2, although only an end having a dome 3 is shown. The tank 20, as is shown in further detail in FIG. 2, is buried in the ground, so that its top is, for instance, located 1 meter below the surface of the ground. The tank 20 is used, for instance, for temporary storage of mineral oil-based liquid fuels at service stations. The dome 3 forms an access pipe and has a lid flange 21 with a dome lid 22. A fill tube 23 for a fluid 10 is ducted through the dome lid 22 and retained there, so that it protrudes into the interior of the container. The tube 23 can also serve as an extraction tube. A first sound waveguide 4 extending over virtually the entire height of the tank is introduced into the tank 20 through the dome 3. The lower end of the first sound waveguide 4 has a transverse tube 5 disposed approximately parallel to the tank bottom, which forms a second sound waveguide for a reference measuring path 11. In the case of a tank diameter D of approximately 3 m, both the first sound waveguide 4 and the second sound waveguide or transverse tube 5 have an inside diameter of approximately 50 mm. The first sound waveguide 4 has openings 6 in a lower region thereof, through which the interior of the tubes 4 and 5 communicates with the fluid 10 in the tank 20, so that according to the principle of communicating tubes, a level 9', which is the same as a level or surface 9 of the remaining volume of the fluid 10, is established in the first sound waveguide 4. The second sound waveguide 5, which will be referred to below as the transverse tube for simplicity, is provided with a sound hole 7 in the vicinity of one end, on the side toward the tank bottom.

The vertical first sound waveguide 4 and the horizontal transverse tube 5 are part of a T-shaped unit of a measuring tube 24 which has first, second and third sound pulse transmitters and receivers S1, S2, S3.

The first sound pulse transmitter and receiver S1 is secured in the transverse tube 5 opposite the mouth of the first sound waveguide 4. The first sound pulse transmitter and receiver S1 sends and receives sound pulses that are reflected from the level 9' of the fluid 10 in the direction of a double arrow 8 corresponding to a main measuring path. The opening 6 in the first sound waveguide 4 assures that the level 9' of the fluid 10 inside the sound waveguide 4 will precisely match the level 9 of the fluid outside the sound waveguide 4, as already indicated. Moreover, the considerable size of the cross section of the sound waveguide 4 assures that any departure in surface shape from the horizontal, due to surface tension of the fluid 10, will be negligibly slight.

The second sound pulse transmitter and receivers S2 is supported at one end wall of the transverse tube 5. The second sound pulse transmitter and receiver S2 sends and receives sound pulses that are reflected by the opposite end wall of the transverse tube 5 in the direction of the double arrow 11 which indicates the reference measuring path. Since the length of the transverse tube 5, as a reference path, is known with precision, the sound velocity inside the reference path 11, and with certain limitations the type of fluid 10, can be derived from the transit or travel time of the sound pulses transmitted and received by the sound pulse transmitter and receiver S2.

The third sound pulse transmitter and receiver S3 is mounted opposite the sound hole 7 in the transverse tube 5. The third sound pulse transmitter and receiver S3 transmits and receives in the direction of a vertical double arrow 12.

The third sound pulse transmitter and receiver S3 receives an echo of a level 13 as the first echo in each case, from every pulse transmitted. The level 13 is a sump boundary layer between the fluid 10 and contaminants, such as water and dirt, that have settled to the bottom of the tank 20 because of their greater density.

Figure 2:
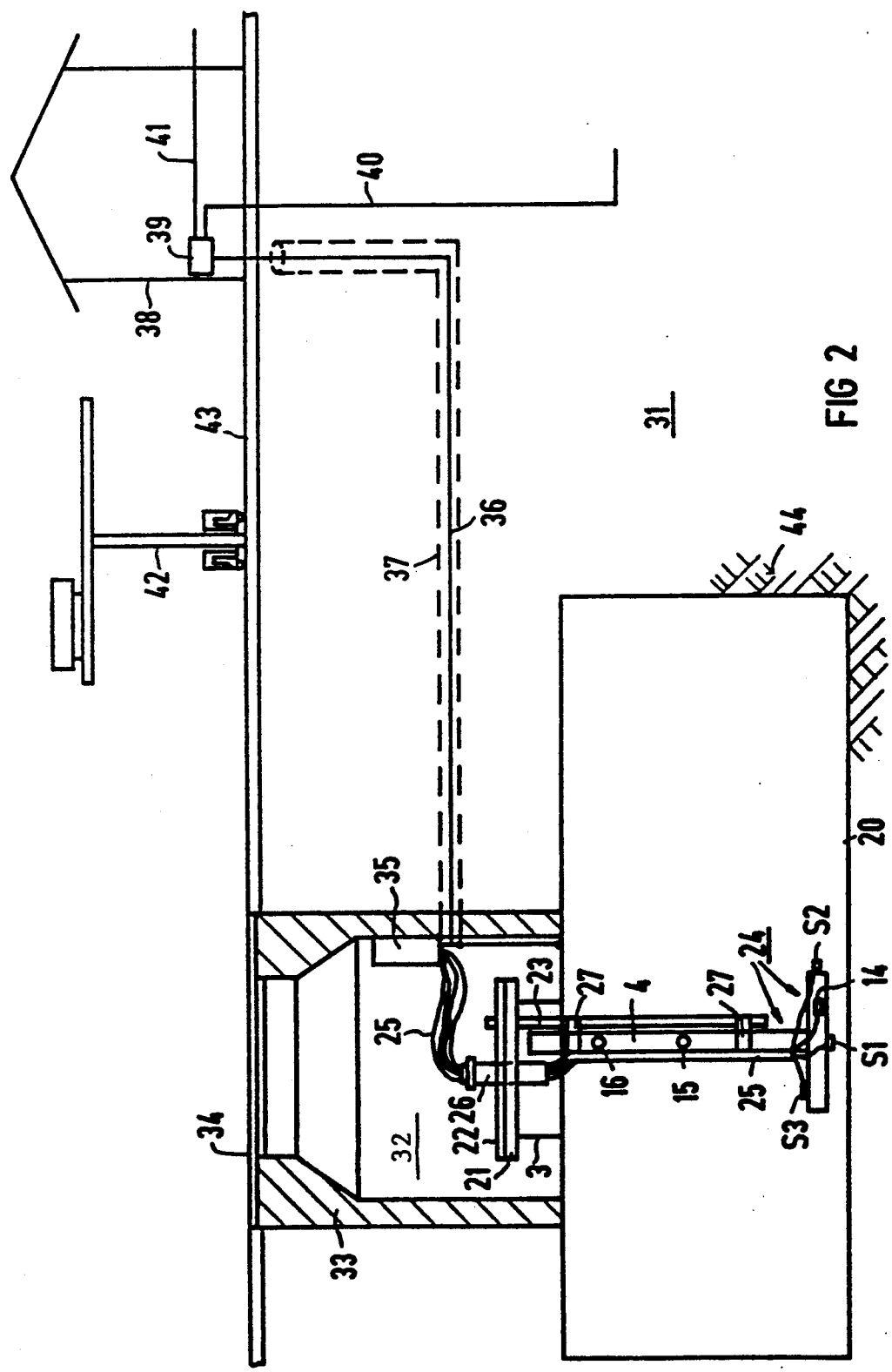
FIG. 2 is a partly sectional, elevational view of an outline of a tank installation of a service station, including a somewhat modified tank that has a fill level measuring device according to FIG. 1.

In the fill level measuring device of FIG. 1, there are also temperature sensors 14, 15, 16, through which the fluid temperature is detected at the level of the transverse tube 5, and at the heights of one-third and two-thirds of the maximum allowable fill height of the tank 20. The temperature sensor 14 is a reference temperature sensor for the reference path represented by the double arrow 11. A reference temperature $T_{Ref}$ of the partial fluid volume of the reference path 11 can be measured with the temperature sensor 14. Through the use of the second sound pulse transmitter and receiver S2, a sound velocity $v^*(T_{Ref})$ for the fluid volume at the reference temperature $(T_{Ref})$ is also ascertained, on the basis of an applicable measured transit time difference $\Delta t$. The result is a sound velocity $v^*(T_{Ref})$ for the known length of the reference path 11 and at the measured reference temperature $T_{Ref}$. The reference path 11 is also used to ascertain a correction factor $K_k$, which is used to calculate an average or temperature-corrected sound velocity from the reference sound velocity $v^*$. This correction factor is defined as follows:

$$K_k = \frac{1}{\Delta T^*} \cdot \frac{v(T_1) - v(T_0)}{v(T_0)}$$

In this equation, $\Delta T^*$ is defined by the difference $T_1 - T_0$, wherein $T_1$ and $T_0$ are two different temperatures of the fluid 10, which are measured at the reference path 11 with the reference temperature sensor 14, and $v(T_1)$ and $v(T_0)$ are the associated sound velocities which are measured by using the reference path. The correction factor, or more generally the correction function $K_k$, indicates the standardized variation of the sound velocity per degree of temperature variation of the fluid volume 10, on the basis of the measurements of $T_1$, $T_0$, $v(T_1)$, $v(T_0)$.

The temperature-corrected fill level is ascertained in accordance with the equation $h(T) = v(T) \cdot t_H$, in which $t_H$ is the portion of the transit time difference $\Delta t_1$ corresponding to the fill level, that is measured with the first sound pulse transmitter and receiver S1. If the measurement pulse makes only one round trip, as shown, then $t_H = \Delta t_1 / 2$.

In order to ascertain the temperature-corrected sound velocity $v(T)$ for the entire fluid volume, the following basic equation is used:

$$v(T) = v^*(T_{Ref}) \cdot [1 + K_k \cdot \Delta T].$$

In this equation, all of the variables are known, except for $\Delta T = TM - T_{Ref}$, where TM is the mean temperature TM in the fluid volume. Means are provided or determining this temperature, in the form of the temperature sensors 14, 15 and 16 that were already mentioned, for detecting the temperature distribution over a fill level height h. With these temperature sensors, the mean temperature TM of the fluid volume can be ascertained relatively accurately, as will be described below in conjunction with FIGS. 3-5. The reference temperature sensor 14 is used not only to ascertain the reference temperature $T_{Ref}$ but is also used along with the other two temperature sensors for measuring the temperature distribution over the fill level height.

In FIG. 3, the fill height h (on the ordinate) is plotted over the temperature axis T (on the abscissa). HU is the height or vertical position of the lower temperature sensor 14, which measures a temperature TSU. HM is the height of the mean temperature sensor 15, which is capable of measuring a temperature TSM, wherein TSM is greater than TSU. HO is the height of the upper temperature sensor 16, which is capable of measuring a temperature TSO, wherein TSO is greater than TSM.

FIGS. 3-5 are based on a graduated averaging process. On the basis of the disposition of three temperature sensors, which are distributed over the fill height h, three possible cases for the fluid level (or gasoline level) in the tank 20 should be taken into account. An installation tolerance for the particular temperature sensor has been added to the height indications HO, HM, HU, in order to assure that any sensor that is not immersed in the fluid will not be used for the temperature averaging. The three possible cases are as follows:

1. The fill height $h = H_1$. In other words, it is higher or substantially higher than 1, or it is higher or substantially higher than the installed height HO of the temperature sensor 16, as seen in FIG. 3.

2. The fill height $h = H_2$. In other words, it is located between HM (middle height of the sensor 15) and HO (installation height of the upper temperature sensor), as seen in FIG. 4 in combination with FIG. 3.

3. The fill height $h = H_3$. In other words, it is located below the installed height HM of the middle temperature sensor 15, so that only the lower temperature sensor 14 is used for measurement, as seen in FIG. 5 in combination with FIG. 3.

The formula "TM 1" pertains for case (1):

$$TM = \frac{1}{H_1} \left[ \underbrace{\left(H_1 - \frac{HO + HM}{2}\right) \cdot TSO}_{\text{area } A} + \underbrace{\frac{(HO - HU)}{2} TSM}_{B} + \underbrace{\frac{(HM + HU)}{2} TSU}_{C} \right],$$

the formula "TM 2" applies to case (2):

$$TM = \frac{1}{H_2} \left[ \underbrace{\left(H_2 - \frac{HM + HU}{2}\right) \cdot TSM}_{\text{area } A'} + \underbrace{\frac{(HM + HU)}{2} TSU}_{B'} \right]$$

and the formula TM 3 applies for the simplest case (3):

$$TM = TSU.$$

Briefly, in case (1), the areas A (diagonal shading from bottom left to top right), B (diagonal shading from top left to bottom right) and C (crosshatching) are added together and then divided by the entire fill level height of the applicable case, in this case $H_1$, with the result then being the mean temperature TM (formula TM 1). Case (2) is somewhat simpler, because only the areas A' and B' need to be added. The resulting area (A'+B') is then divided by the applicable fill level height $H_2$, in order to obtain TM. Case (3) is the simplest, because at this fill level height $H_3$, the temperature TSU measured by the bottom temperature sensor 14 then simultaneously represents the mean temperature TM.

The graduated averaging described above is relatively simple and produces relatively accurate results. The accuracy can be further increased if needed by installing additional temperature sensors, for instance an additional fourth and perhaps fifth temperature sensor. TM could also be ascertained by linear averaging, rather than by a graduated averaging process. In that process, a straight line would be drawn connecting the points 14 and 15 in FIG. 3, and another straight line would be drawn connecting point 15 and point 16. A calculation of the portion of the area for the areas formed between the straight lines and the ordinate axis would then be made, and the resulting area would be divided by the entire fill level height. However, in terms of its formula, this process is not as simple as the graduated averaging explained above. Graduated averaging is also superior to so-called curved averaging, in which the points 14, 15 and 16 are connected by a parabola.

Returning to FIG. 1: It can be seen that the temperature sensors 15 and 16 are secured to the outside of the first sound waveguide 4. As a result, the source of sound for the main measuring path 8 is not affected or impaired. The measuring tube 24 with the first sound waveguide 4 are retained on the fill tube 23, in such a way as to be axially parallel to its longitudinal axis. Measurement and current supply lines 25 of the temperature sensors 14, 15, 16 and the sound pulse transmitters and receivers S1, S2, S3 are disposed on the outside of the first sound waveguide 4, as the drawing shows, and are ducted to the outside through a gas-tight line duct 26 in the dome lid 22. The measurement and current supply lines 25 are merely schematically shown in dashed lines in the lower region of the measuring tube 24.

They are retained in the form of a bundle of lines on the first sound waveguide 4 by means of cable clamps 27. The sound waveguide 4 is secured to the fill tube 23 in a vertically aligned position by means of adjustable double clamps 28, as shown. FIG. 1 also schematically shows an evaluation unit 29, which is connected through measurement amplifiers that are not shown in FIG. 1, to the measurement and current supply lines 25 and which has a display field 30 that indicates a fill level of 1710 mm, for instance, and an average temperature TM of 49° C.

FIG. 2 shows a complete tank installation 31 with a dome shaft 32 that is constructed of masonry 33 and is covered toward the outside in a functionally secure manner by a hatch 34 in the form of a steel plate or the like. The dome 3 of the tank 20 is accessible through the dome shaft 32. The tank is constructed substantially like the tank 20 of FIG. 1 and also has a corresponding fill level measuring device. A control panel 35 for an electronic measurement unit to which the measurement and current supply lines 25 are run is disposed on the inner periphery of the dome shaft 32. The control panel 35 suitably includes measurement amplifiers and a lightning protection unit. In this context it should be mentioned that the cable duct 26 is constructed to be flashback-proof. A connecting cable 36 is laid from a control box for an electronic measuring unit through the ground in a cable conduit 37 at a depth of approximately 1 m (so that it is protected against frost), as far as a control unit 39 disposed in a building 38. As an example, a maximum of eight connecting lines 40 may lead from this control unit 39 to other non-illustrated tanks, and a data line 41 also leads to a computer that is used for measurement data processing. A foundation of the tank installation 31, on which gas pumps 42 and the building 38 are located, is identified by reference numeral 43. The connecting cable 36 leading to the control unit 39 in the building 38 is ducted through this foundation or pavement 43. Reference numeral 44 diagrammatically indicates the ground in which the tank 20 is located.

Figure 6:
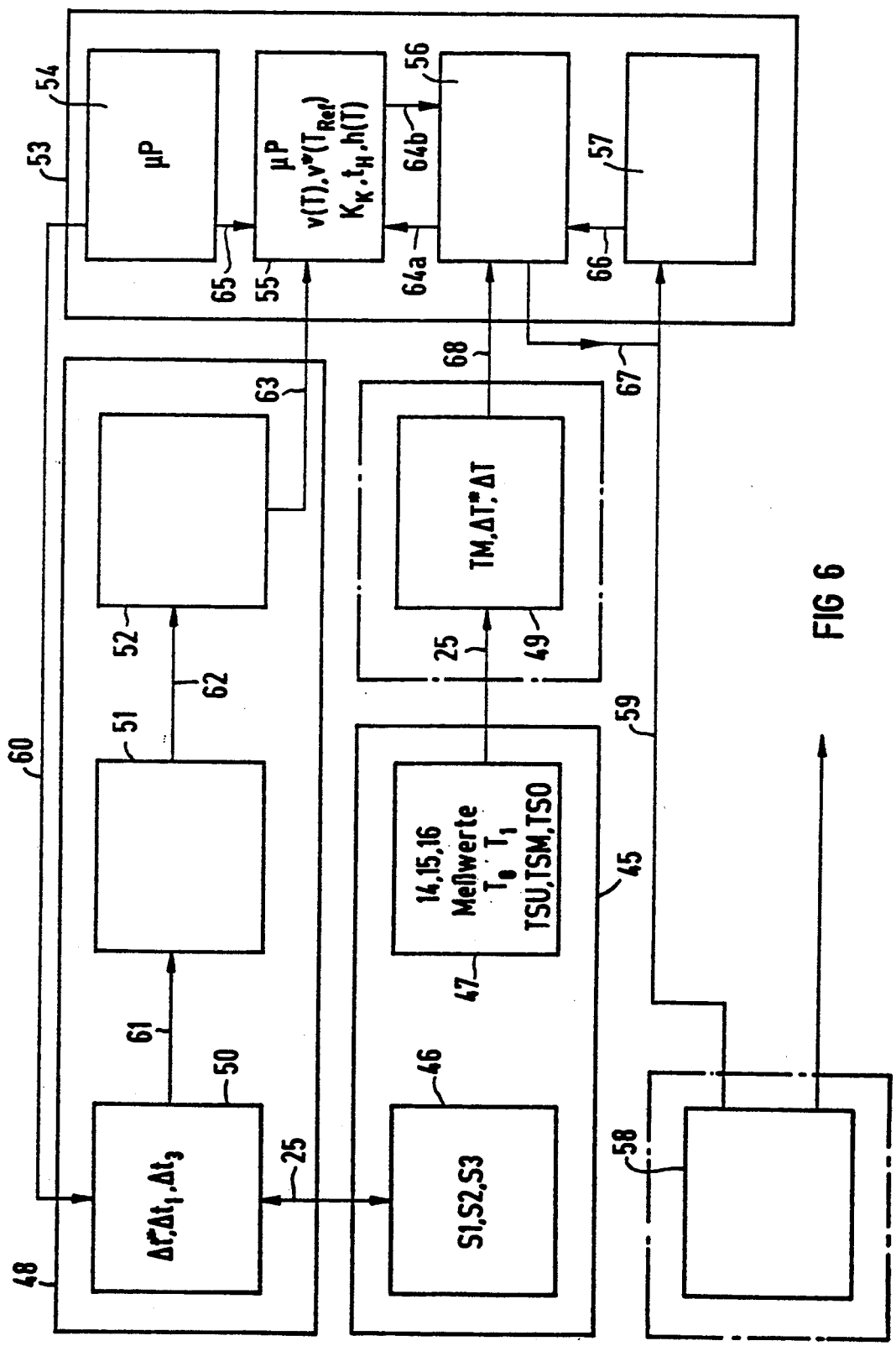
FIG. 6 is a block circuit diagram of measured value transducers and evaluation electronics connected to thereto for a fill level measuring device according to the invention.

The block circuit diagram of FIG. 6 shows the electronic components of a fill level measuring device according to the invention. A box 45 encloses a component unit 46 with so-called level sensors, that is the sound pulse transmitters and receivers S1, S2, S3, and a component unit 47 including the temperature sensors 14, 15, 16. The component units 46, 47 communicate through the signal and current supply lines, shown schematically at reference numeral 25, with an ultrasound control and supply unit 48 on one hand, and with a temperature measurement signal evaluation unit 49 on the other hand. The unit 48 includes a "sensor triggering and echo signal reception" subunit 50, a "sensor signal amplifier" 51, and a "sensor signal digitizing" subunit 52. A computer and voltage regulator unit 53 which is also provided, includes a "microprocessor control" subunit 54, a "microprocessor evaluation" subunit 55, a "measurement data output" unit 56, and a "voltage regulator" 57. Reference numeral 58 indicates a power supply unit, which is electrically connected to the voltage regulator 57 through a multiple-conductor current supply and signal cable 59. Additional measurement and control lines are provided in the form of a line 60 leading from the microprocessor control subunit 54 to the component subunit 50, a line 61 leading from the component subunit 50 to the amplifier 51, from which a line 62 leads to the subunit 52, and from which a line 63 again leads to the microprocessor evaluation subunit 55. This last-mentioned subunit 55 is connected for dialog through lines 64a, 64b to the measurement data output unit 56, and the microprocessor control subunit 54 is connected with the microprocessor evaluation subunit 55 through a data line 65. A supply line 66 leads from the voltage regulator 57 to the "measurement data output" unit 56, and an electrical signal line 67 is fed back from that unit to an input of the voltage regulator 57 through the connecting line 59. The processed temperature measurement signals TM, $\Delta T^*$, $\Delta T$ reach the "measurement data output" unit 56 over signal line 68. The measured values $T_0$, $T_1$, TSU, TSM, TSO that are needed to calculate the mean temperature TM can be ascertained with the component unit 47.

Piezoceramic sensors are preferably used as the sound pulse transmitters and sound pulse receivers S1, S2, S3. The sound transit or travel times in each case are measured from the instant of sensor short circuit until the arrival of the first amplitude of an echo. A piezoceramic wafer that is glued into a housing, which is preferably made of stainless steel or plastic, in such a way that the housing thickness of the side of the sensor facing toward the filling medium is adapted to the wavelength of ultrasound (multiples of $\lambda/4$ and preferably $\lambda/2$), is used as the basic component of such sensors. The component subunit 50 contains transit time counter oscillators, which produce predetermined counting pulses at a fixed rhythm to detect the sound transit times. The frequency of the ultrasound pulses transmitted by the sound pulse transmitters S1-S3 is preferably in a ratio of from 1:3 to 1:6 to the frequency of the transit time counter oscillator. For the sake of providing high basic measurement accuracy, the resonant and operating frequency is set to 2 MHz, which in water is equivalent to a wavelength of 0.75 mm. The transit time counter oscillator preferably has an operating frequency of 8 MHz.

For the temperature sensors 14–16, a differential measurement accuracy of approximately one-tenth of a degree is provided, so that even relatively small temperature gradients within the tank 20 can be detected.

A method for determining the fill level in containers filled with fluid, preferably in tanks of tank installations, is achieved with the fill level measuring device explained above in conjunction with FIGS. 1-6. In this method, the fill level height is determined from the sound transit time of ultrasound pulses that are projected along the main measuring path 8, extending from the bottom region of the container 20 up to the surface 9 of the fluid, by the first sound pulse transmitters S1 and are reflected from the surface 9 of the fluid to first sound pulse receivers, which are likewise provided by element S1, because transmit-receive test heads are used.

As seen in the subunit 55 of FIG. 6, a temperature-corrected sound velocity v(T) in the fluid volume is ascertained in accordance with the following equation:

$$v(T) = v^*(T_{Ref}) \cdot [1 + K_k \cdot \Delta T].$$

From this, a temperature-corrected fill level height $h(T) = v(T) \cdot t_H$ is ascertained, in which the correction factor $K_k$ is defined as described above. The reference path 11, with which the values $v(T_1)$, $v(T_0)$, $T_1$, $T_0$ and the reference temperature $T_{Ref}$ are measured, is used in order to ascertain the correction factor $K_k$, as was also already explained. From the mean temperature TM found by averaging, $\Delta T = TM - T_{Ref}$ can then be ascertained, and the temperature difference $\Delta T^*$ can be ascertained from the difference $T_1 - T_0$. The components 49 and 55 are used to ascertain the derived variables.

In ascertaining the fill level height h(T), the sump height b in the container or tank 20 is preferably used as well. The fill level height h*(T) that takes the sump height b into account is ascertained by the following equation:

$$h^*(T) = t_H \cdot v(T) + t_S \cdot v^*(T) - a + b.$$

This equation and the variables it contains have already been explained previously above.

When the method is carried out, the sound pulses picked up by the sound pulse receivers S1, S2, S3 are suitably amplified as a function of the sound transit time. This operation is performed in the amplifier 51 of FIG. 6. The ultrasound reception signals are then digitized in the next subunit 52, before they are carried to the evaluation subunit 55 of the microprocessor. In this evaluation unit 55, the fluid volume can also be determined, on the basis of the ascertained fill level height h(T), or preferably h*(T), through multiplication by a factor taken from a non-illustrated tank characteristic curve, and from that, the fluid quantity can be determined by multiplication with the density derived from the temperature distribution. The pulse duration of the sound pulses is suitably selected to be less at low fill heights than at fill heights near a maximum allowable fill height, as already explained. When the method is carried out, the measuring tube 24 has an advantageous effect in the sense that feedback from surface motions of the fluid 10 on the fill level in the first sound waveguide 4 can be minimized by this waveguide itself and by multiple measurements.

Figure 7:
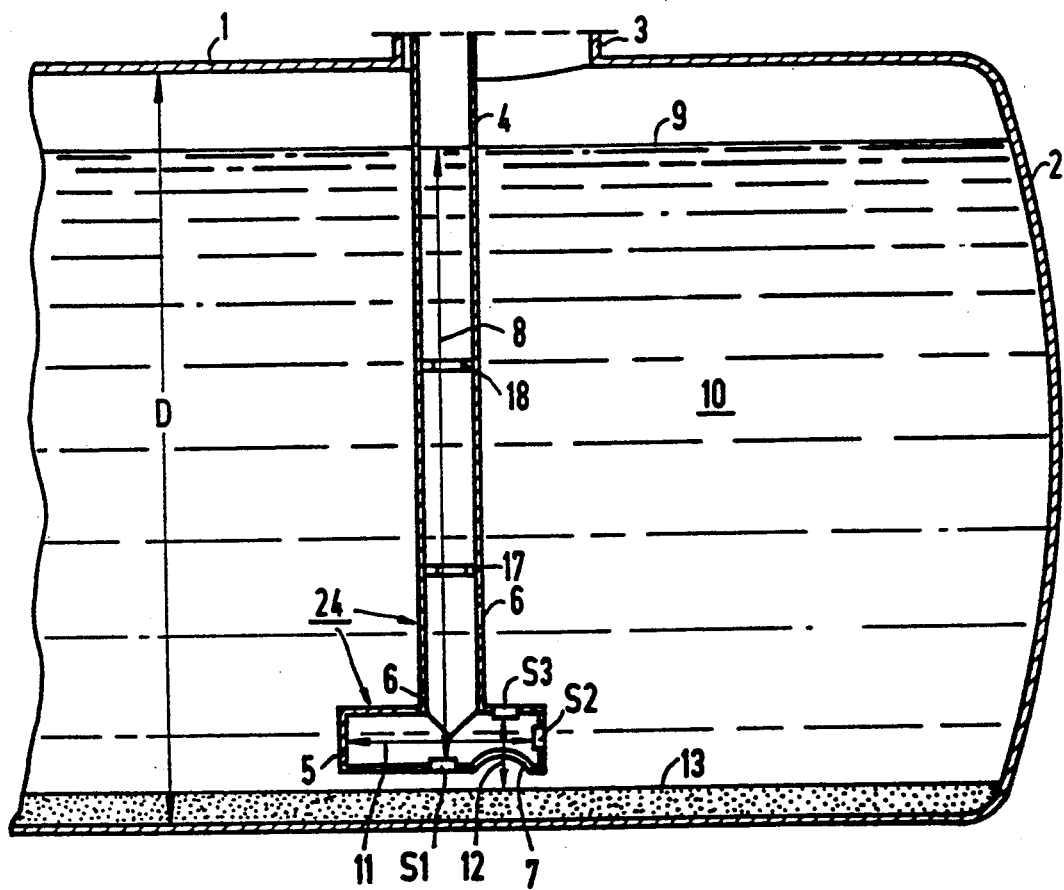
FIG. 7 is a view similar to FIG. 1 of a modified fill level measuring device which is used to illustrate the advantageous use of a T-shaped measurement tube that is combined from a longitudinal and a transverse tube, in fill level measuring devices that work with reference reflectors or screens.

FIG. 7 also serves to illustrate an advantageous use for the invention. In this drawing, which is simplified as compared with FIG. 1, measuring screens or reference reflectors 17, 18, that are distributed over the fill level height, are installed on the inner periphery of the first sound waveguide 4. The measuring tube that is shown herein and identified as a whole by reference numeral 24, and which is again a combination of the first and second sound waveguides 4, 5, serves to accommodate and retain one or more sound pulse transmitters and receivers S1, S2, S3 and the reference reflectors 17 and 18 of a fill level measuring device, in which the reference reflectors are disposed along the fill level height at a defined spacing from one another and from the sound pulse transmitters and receivers S1. The ultrasound pulses reflected by the reference reflectors 17, 18 produce transit time differences which, together with the associated, known sound travel distances, enable the ascertainment of an average sound velocity that takes the density in the fluid volume 10 into account. The fill level height can be ascertained from the average sound velocity and from the transit time difference of the applicable ultrasound measurement pulses, referred to the fluid surface.

We claim:

1. A fill level measuring device for containers filled with fluid, comprising:

a first sound pulse transmitter emitting ultrasound pulses along a main measuring path from bottom region of a container to a surface of a fluid volume in the container, and a first sound pulse receiver receiving the ultrasound pulses being reflected by the surface of the fluid volume, for determining a fill level height h from a sound transit time of the ultrasound pulses;

means for detecting a temperature distribution over the fill level height having an output variable being a mean temperature TM of the fluid volume;

a second sound pulse transmitter and a second sound pulse receiver respectively defining a beginning and an end of a reference measuring path of a partial fluid volume, said means for detecting the temperature distribution including means for measuring a transit time difference $\Delta t^*$ in the reference path, at least one reference temperature sensor for measuring a reference temperature $T_{Ref}$ of the partial fluid volume of the reference path, and for ascertaining a sound velocity $v^*$ ($T_{Ref}$) in the fluid volume at the reference temperature $T_{Ref}$ on the basis of the transit time difference $\Delta t^*$ measured by said transit time difference measuring means;

evaluation means for determining a temperature-corrected sound velocity $v(T)$ in the fluid volume using the equation:

$$v(T) = v^*(T_{Ref})[1 + K_k \cdot \Delta T]$$

and for determining a temperature-corrected fill level height using the equation:

$$h(T) = v(T) \cdot t_H$$

in which $$\Delta T > TM - T_{Ref}$$

$$K_k = \frac{1}{\Delta T^*} \cdot \frac{v(T_1) - v(T_0)}{v(T_0)}$$

$$\Delta T^* = T_1 - T_0$$

and wherein:

$T_1$ and $T_0$ are two different temperatures of the fluid volume measured on the reference measuring path with said reference temperature sensor, $v(T_1)$ and $(T_0)$ are associated sound velocities measured with the reference path, $K_k$ is a correction factor indicating a standardized variation in the sound velocity per degree of temperature variation of the fluid volume on the basis of the measurements of $T_1$, $T_0$, $v(T_1)$, $v(T_0)$, and $t_H$ is a portion of a transit time difference $\Delta t_1$ evaluated by the evaluation means corresponding to the fill level height h being measured with each of said first sound pulse transmitter and receiver.

2. The fill level measuring device according to claim 1, wherein the container is a tank of a tank installation.

3. The fill level measuring device according to claim 1, wherein said means for detecting the temperature distribution also include at least one other temperature sensor, said temperature sensors being disposed at a plurality of measurement points distributed over the fill level height, for measuring temperature values from which the mean temperature of the fluid volume can be derived by averaging.

4. The fill level measuring device according to claim 3, wherein said means for determining the temperature distribution includes further temperature sensors including at least one temperature sensor disposed in the vicinity of a bottom of the container, at least on temperature sensor disposed at approximately one-third and at least one temperature sensor disposed at approximately two-thirds of a maximum fill level height of the container.

5. The fill level measuring device according to claim 1, including a vertically aligned first sound waveguide for the main measuring path, said first sound waveguide extending from a bottom region of the container up to a height above a highest fill level; said first sound waveguide having an interior communicating with a remaining fluid volume in the container through openings formed in said first sound waveguide; said first sound waveguide having a lower end at which one of said first sound pulse transmitters and one of said first sound pulse receivers are disposed; said first sound waveguide having an outer surface, and said at least one other temperature sensor being at least two other temperature sensors secured to said outer surface of said first sound waveguide.

6. The fill level measuring device according to claim 1, including a vertically aligned first sound waveguide for the main measuring path, said first sound waveguide extending from a bottom region of the container up to a height above a highest fill level; said first sound waveguide having an interior communicating with a remaining fluid volume in the container through openings formed in said first sound waveguide; and said first sound waveguide having a lower end at which one of said fist sound pulse transmitters and one of said first sound pulse receivers are disposed.

7. The fill level measuring device according to claim 6, including a second sound waveguide for the reference measuring path, said at least one second sound pulse transmitter, said at least one second sound pulse receiver and said at least one reference temperature sensor being secured on said second sound waveguide, and said second sound waveguide having an interior communicating with a remaining fluid volume through at least one opening formed in said second sound waveguide.

8. The fill level measuring device according to claim 7, wherein said second sound waveguide is a transverse tube disposed near the bottom of the container.

9. The fill level measuring device according to claim 8, wherein the lower end of said first sound waveguide is structurally united with said transverse tube forming a T-shaped, continuously hollow measuring tube.

10. The fill level measuring device according to claim 9, wherein said main measuring path has a longitudinal axis, said transverse tube has a wall with an inner periphery, said first sound pulse transmitters and said first sound pulse receivers have a transmit-receive test head secured to the inner periphery of said transverse tube wall in alignment with the longitudinal axis of the the main measuring path, and said test head transmits ultrasound pulses from bottom to top and receives the ultrasound pulses traveling from top to bottom after being reflected by the surface of the fluid volume.

11. The fill level measuring device according to claim 10, including a third sound pulse transmitter and a third sound pulse receiver respectively transmitting from top to bottom and receiving from bottom to top, for determining a level of a sump formed by foreign fluids and contamination, below the fluid volume in the container.

12. The fill level measuring device according to claim 11, wherein said transverse tube has ends, said at least one opening formed in said transverse tube is a downwardly pointing sound hole being formed in one of said ends and having an axis, and including a transmit-receive test head for said third sound pulse transmitter and said third sound pulse receiver being secured to the inner periphery of said transverse tube in alignment with the axis of said sound hole and above said sound hole.

13. The fill level measuring device according to claim 9, including a fill tube for the fluid volume protruding into the interior of the container and having an axis, an access pipe or dome having a lid flange and a dome lid for sealingly guiding and retained said fill tube, said first sound waveguide being retained on and axially parallel to the longitudinal axis of said fill tube and having an outer surface, and measurement and current supply lines for said temperature sensors and said sound pulse transmitters and receivers being disposed on the outer surface of said first sound waveguide, and a gas-tight line duct in said dome lid through which said measurement and current supply lines are ducted to the outside.

14. The fill level measuring device according to claim 1, wherein said sound pulse transmitters and said sound pulse receivers are piezoceramic sensors, and the sound transit times are each measured from the moment of a sensor short circuit until the arrival of a first amplitude of an echo.

15. The fill level measuring device according to claim 14, including a transit time counter oscillator specifying counting pulses at a fixed rhythm for detecting the sound transit times, the frequency of the transmitted ultrasound pulses being in a ratio of 1:3 to 1:6 to the frequency of said transit time counter oscillator.

16. The fill level measuring device according to claim 15, wherein the frequency of the transmitted ultrasound pulses is 2 MHz and the frequency of said transit time counter oscillator is 8 MHz.

17. A method for determining a fill level in containers filled with fluid, which comprises:

emitting ultrasound pulses from a first sound pulse transmitter along a main measuring path extending from a bottom region of a container to a surface of a fluid volume in the container and reflecting the ultrasound pulses from the surface of the fluid volume to a first sound pulse receiver, for determining a fill level height h from a sound transit time of the ultrasound pulses;

measuring the temperature at a plurality of measurement points distributed over the fill level height h and deriving the mean temperature TM of the fluid volume from the plurality of temperatures;

measuring a sound velocity $v^*(T_{ref})$ at a reference temperature $T_{ref}$ along a reference path of known length in the fluid volume, the velocity being derived from transit time differences of the ultrasound pulses ensuing between a second sound pulse transmitter at a beginning and a second sound pulse receiver at an end of a reference path;

ascertaining a temperature-corrected sound velocity $v(T)$ in the fluid volume in accordance with the equation:

$$v(T) = v^*(T_{Ref})[1 + K_k \cdot \Delta T]$$

ascertaining a temperature-corrected fill level height $$h(T) = v(T) \cdot t_H$$

therefrom,
and defining a correction factor $K_k$ with the equation:

$$K_k = \frac{1}{\Delta T^*} \cdot \frac{v(T_1) - v(T_0)}{v(T_0)}$$

wherein $$\Delta T^* = T_1 - T_0$$

$$\Delta T^* = T_M - T_{Ref}$$

and wherein:

$T_{ref}$ is the reference temperature at the reference path at the time of the particular transit time measurement;

$T_1$ and $T_0$ are two different temperatures of the fluid volume measured at the reference path;

$v(T_1)$ and $v(T_0)$ are associated sound velocities ascertained with the reference path;

$K_k$ is a medium-specific correction factor indicating a standardized variation in the sound velocity per degree of temperature variation of the fluid volume; and $t_H$ is a portion of the transit time difference $\Delta t_1$ corresponding to the fill level height measured with the respective first sound pulse transmitter and receiver.

18. The method according to claim 17, which comprises emitting the ultrasound pulses in a tank of a tank installation.

19. The method according to claim 17, which comprises ascertaining the fill level height h(T) taking a sump height b in the container into account, disposing a third sound pulse transmitter and receiver in a region near the bottom of the fluid volume and measuring, with the third sound pulse transmitter and receiver a portion $t_S$ of a transit time difference $\Delta t_S$ corresponding to the sump height;

measuring a vertical distance a between the first and the third sound pulse transmitters and receivers;

measuring the sump height b with the third sound pulse transmitter and receivers; and ascertaining the fill level h*(T) taking the sump height b into account in accordance with the equation:

$$h^*(T) = t_H \cdot v(T) + t_S \cdot v(T) - a + b$$

20. The method according to claim 17, wherein comprises amplifying the sound pulses picked up by the sound pulse receivers as a function of the sound transmit time.

21. The method according to claim 17, which comprises determining a temperature distribution by measuring the temperature at a plurality of measurement points along the main measuring path and along the reference path, determining the fluid volume from the fill heights h(T), h*(T) by multiplication with a factor taken from a tank characteristic curve for this purse, and determining the fluid volume quantity therefrom by multiplication by a density derived from the temperature distribution.

22. The method according to claim 17, which comprises providing a sound waveguide through which the main measuring path extends and minimizing, with the waveguide itself and y performing multiple measurements, feedback from surface motions in the fluid volume upon the fill level in the sound waveguide.

23. The method according to claim 17, which comprises selecting a pulse duration of the sound pulses to be less at low fill heights than at fill heights near a maximum allowable fill height.

* * * * *